United States Patent [19]

Kadowaki et al.

[11] Patent Number: 5,283,771
[45] Date of Patent: Feb. 1, 1994

[54] OPTICAL PICKUP HEAD

[75] Inventors: Shinichi Kadowaki; Yoshiaki Komma; Seiji Nishino, all of Osaka, Japan

[73] Assignee: Matsushita Electric Industrial Co., Ltd., Osaka, Japan

[21] Appl. No.: 666,768

[22] Filed: Mar. 8, 1991

[30] Foreign Application Priority Data

Jun. 26, 1990 [JP] Japan .................................. 2-167673

[51] Int. Cl.⁵ .............................................. G11B 7/12
[52] U.S. Cl. .................... 369/44.14; 369/103; 369/112
[58] Field of Search .............. 369/103, 112, 44.12, 369/44.14, 44.19, 44.11; 359/572, 850

[56] References Cited

U.S. PATENT DOCUMENTS

| | | | |
|---|---|---|---|
| 4,644,516 | 2/1987 | Musha | 369/43 |
| 4,665,310 | 5/1987 | Heemskerk . | |
| 4,757,197 | 7/1988 | Lee . | |
| 4,789,977 | 12/1988 | Oudenhuysen et al. | 369/109 |
| 4,929,823 | 5/1990 | Kato et al. . | |
| 5,005,162 | 4/1991 | Mitsumori et al. | 369/112 |
| 5,082,339 | 1/1992 | Linnebach | 369/103 |

FOREIGN PATENT DOCUMENTS

| | | | |
|---|---|---|---|
| 675797 | 8/1966 | Belgium . | |
| 281256(A) | 9/1988 | European Pat. Off. | 369/103 |
| 0281756 | 9/1988 | European Pat. Off. . | |
| 0326203 | 8/1989 | European Pat. Off. . | |
| 0339900 | 11/1989 | European Pat. Off. . | |
| 0372629 | 6/1990 | European Pat. Off. . | |
| 1-273238A | 1/1989 | Japan . | |

OTHER PUBLICATIONS

Patent Abstracts of Japan, vol. 9, No. 314, P412, Dec. 10, 1985, & JP60143453.

Primary Examiner—Aristotelis Psitos
Assistant Examiner—Muhammad N. Edun
Attorney, Agent, or Firm—Lowe, Price, LeBlanc & Becker

[57] ABSTRACT

In an optical pickup head, a light source emits a light beam. A first reflecting section reflects the light beam emitted from the light source and changes a direction of a travel of the light beam emitted from the light source. A second reflecting section reflects the light beam and changes a direction of a travel of the light beam after the light beam is reflected by the first reflecting section. The light beam reflected by the second reflecting section is focused on the optical recording medium. The light beam is reflected and diffracted by the optical recording medium. The light beam reflected and diffracted by the optical recording medium is detected. A common support member is formed with both the first and second reflecting sections.

2 Claims, 8 Drawing Sheets

OPTICAL PICKUP HEAD

BACKGROUND OF THE INVENTION

This invention relates to an optical pickup head for optically reproducing, recording, or erasing information from or on an optical or magneto-optical recording medium.

An optical recording medium such as an optical disk is formed with a pattern of a groove or pits which represents recorded information. Some optical pickup heads are used in reproducing information from such an optical recording medium. In general, the optical pickup head applies a laser light beam to the optical recording medium and detects the laser light beam reflected back from the optical recording medium. Since the reflected laser light beam depends on a pattern on the optical recording medium, the reflected laser light beam represents information on the optical recording medium. Thus, the detection of the reflected laser light beam enables the reproduction of the information.

Japanese published unexamined patent application 1-273238 discloses an optical pickup head. As will be described later, the optical pickup head of Japanese application 1-273238 has some problem.

U.S. Pat. No. 4,929,823 discloses an optical pickup head which has a holographic optical element disposed in an optical path among a light source, an optical recording medium, and a photodetector unit. The holographic optical element serves to generate reliable focusing and tracking error signals.

SUMMARY OF THE INVENTION

It is an object of this invention to provide an improved optical pickup head.

According to a first aspect of this invention, an optical pickup head operating on an optical recording medium comprises a light source emitting a light beam; a first reflecting section reflecting the light beam emitted from the light source and changing a direction of a travel of the light beam emitted from the light source; a second reflecting section reflecting the light beam and changing a direction of a travel of the light beam after the light beam is reflected by the first reflecting section; means for focusing the light beam reflected by the second reflecting section on the optical recording medium, wherein the light beam is reflected and diffracted by the optical recording medium; means for detecting the light beam reflected and diffracted by the optical recording medium; means for guiding the light beam reflected and diffracted by the optical recording medium to the detecting means; and a common support member formed with both the first and second reflecting sections.

According to a second aspect of this invention, an optical pickup head operating on an optical recording medium comprises a light source emitting a light beam; a first reflecting section reflecting the light beam emitted from the light source and changing a direction of a travel of the light beam emitted from the light source; a second reflecting section reflecting the light beam and changing a direction of a travel of the light beam after the light beam is reflected by the first reflecting section; means for focusing the light beam reflected by the second reflecting section on the optical recording medium, wherein the light beam is reflected and diffracted by the optical recording medium, a holographic optical element diffracting the light beam reflected and diffracted by the optical recording medium, and generating a diffraction light beam from the light beam reflected and diffracted by the optical recording medium; means for detecting the diffraction light beam generated by the holographic optical element; and a common support member formed with both the first and second reflecting sections.

According to a third aspect of this invention, an optical pickup head operating on an optical recording medium comprises a light source emitting a light beam; a common member having first and second reflecting surfaces, the first reflecting surface reflecting the light beam emitted from the light source and changing a direction of a travel of the light beam emitted from the light source, the second reflecting surface reflecting the light beam and changing a direction of a travel of the light beam after the light beam is reflected by the first reflecting surface; means for focusing the light beam reflected by the second reflecting surface on the optical recording medium, wherein the light beam is reflected and diffracted by the optical recording medium; and means for detecting the light beam reflected and diffracted by the optical recording medium.

DESCRIPTION OF THE PRIOR ART

Figure 1:
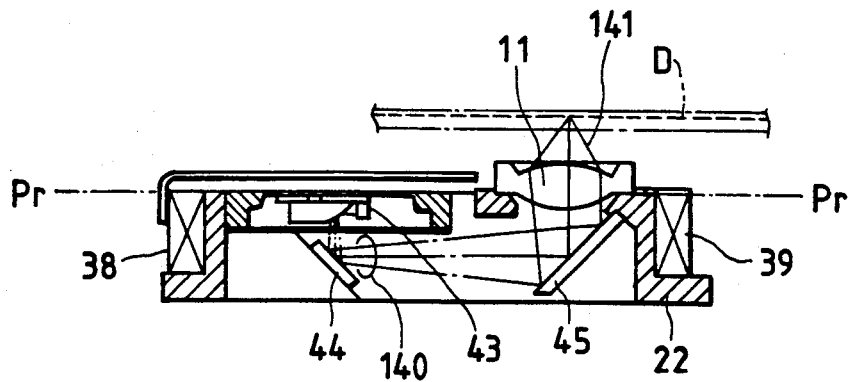
FIGS. 1 and 2 are sectional views of a prior art optical pickup head.
Figure 2:
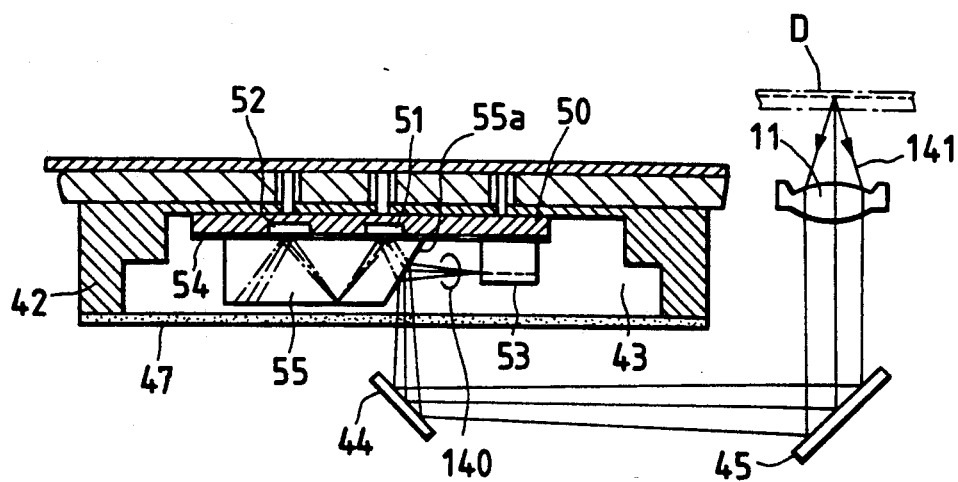

FIGS. 1 and 2 show a prior art optical pickup head disclosed in Japanese published unexamined patent application 1-273238.

With reference to FIGS. 1 and 2, the prior art optical pickup head includes a hybrid device 43. The hybrid device 43 has a semiconductor laser (a light source) 53, photodetectors 51 and 52, and a prism 55 which are housed in a common package 42 partially formed by a cover glass plate 47. The hybrid device 43 is attached to an upper surface of a holding member (a holder) 22.

The hybrid device 43 has an integrated structure including the semiconductor laser (the light source) 53, the photodetectors 51 and 52, and the prism 55. Specifically, the photodetectors 51 and 52 are formed on a semiconductor substrate 50. The semiconductor laser (the light source) 53 is located on a surface of the semiconductor substrate 50 which is covered with a protective film 54. The prism 55 is located on the region of the protective film 54 which opposes the photodetectors 51 and 52. The prism 55 has a semitransparent surface 55a which obliquely opposes an output face of the semiconductor laser (the light source) 53. The laser light beam 140 emitted from the semiconductor laser (the light source) 53 is reflected by the semitransparent surface 55a of the prism 55 toward a reflecting section (a reflector) 44.

Reflecting sections (reflectors) 44 and 45 are supported by the holding member 22. The reflecting section 44 extends below the hybrid device 43. The reflecting section 45 is placed on the optical axis of an objective lens 11 which extends above the holding member 22. The objective lens 11 is supported on the holding member 22. The reference plane of the attachment of the hybrid device 43 to the holding member 22 and the reference plane of the attachment of the objective lens 11 to the holding member 22 are composed of a common plane Pr. The optical axis of the objective lens 11 extends perpendicular to the reference plane of the attachment of the hybrid device 43 to the holding member 22.

The laser light beam 140 emitted from the light source 53 is reflected by the semitransparent surface 55a of the prism 55 and travels to the reflecting section 44 through the cover glass plate 47, being reflected by the reflecting section 44 and then being reflected by the reflecting section 45 toward the objective lens 11. The laser light beam is incident to the objective lens 11, being focused by the objective lens 11 on an optical disk D. In an interior of the holding member 22, the direction of the travel of the laser light beam 140 is changed twice by the reflecting sections 44 and 45. This design enables the whole of the optical pickup head to be small and thin. The optical pickup head can be moved by actuators 38 and 39 for focusing and tracking control purposes.

The laser light beam is reflected back from the optical disk D. The reflected laser light beam 141 passes through the objective lens 11, being guided to the hybrid device 43 while being reflected by the reflecting sections 45 and 44. The reflected laser light beam 141 enters the prism 55 via the semitransparent surface 55a of the prism 55, and then reaches the photodetector 51. Approximately a half intensity of the reflected laser light beam 141 is received by the photodetector 51, and the remainder of the reflected laser light beam 141 is reflected by the photodetector 51. Then, the laser light beam 141 is reflected within the prism 55 toward the photodetector 52 and is received by the photodetector 52. The hybrid device 43 is designed so that a focal point with respect to the laser light beam 141 will be present on the optical path between the photodetectors 51 and 52. The photodetectors 51 and 52 convert the received laser light beams 141 into corresponding electric signals. A radio-frequency information signal, a tracking error signal, and a focusing error signal are generated on the basis of the output signals from the photodetectors 51 and 52.

In order to obtain a good radio-frequency information signal, it is necessary that the laser light beam 140 travels along the optical axis of the objective lens 11. As described previously, the direction of the travel of the laser light beam 140 is changed twice by the reflecting sections 44 and 45 before the laser light beam 140 enters the objective lens 11. In order to ensure that the laser light beam 140 travels along the optical axis of the objective lens 11, a high accuracy in position and angle is required of each of the reflecting sections 44 and 45. This causes a decrease in the efficiency of the production of the optical pickup head.

DESCRIPTION OF THE FIRST PREFERRED EMBODIMENT

Figure 3:
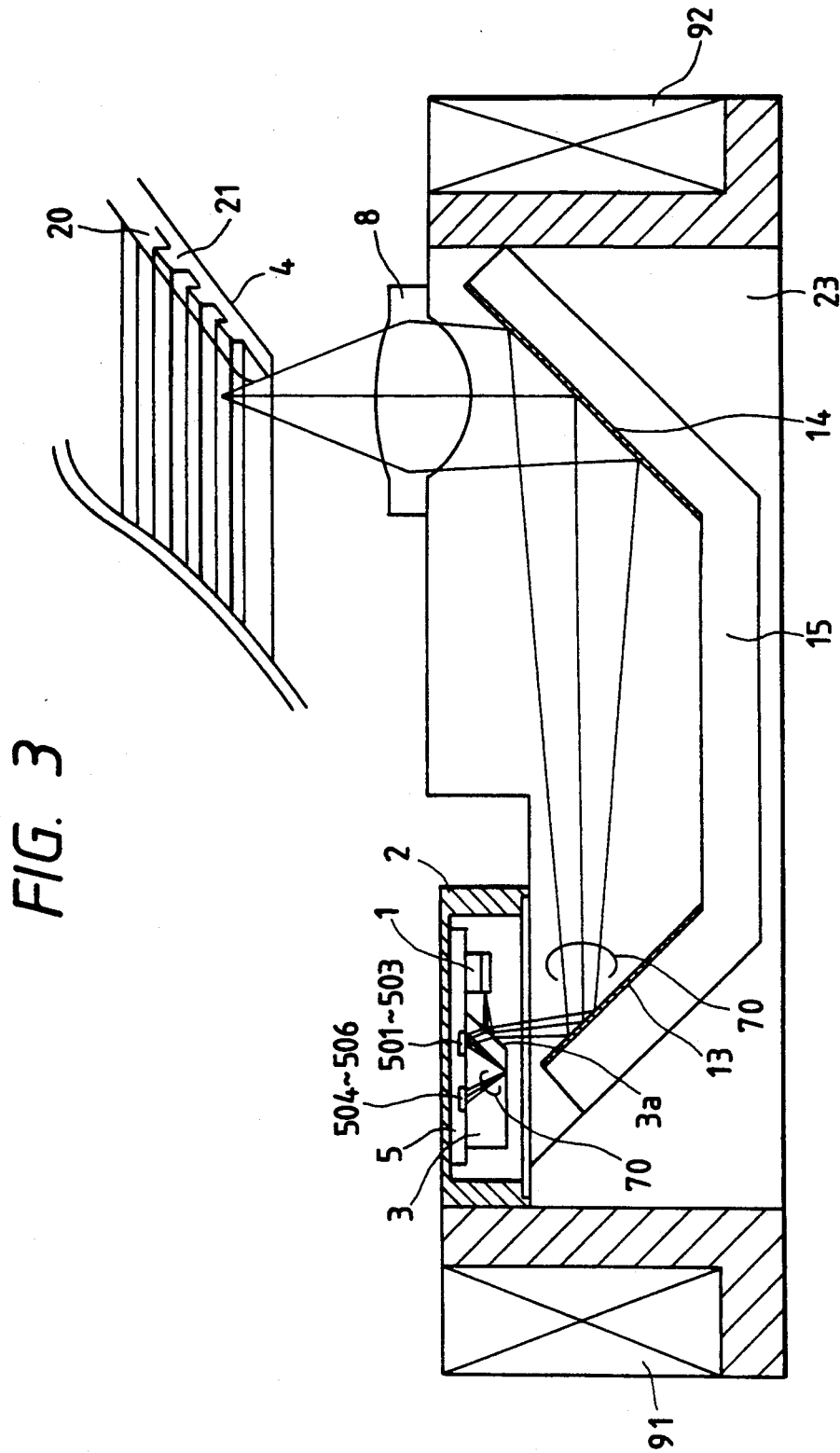
FIG. 3 is a sectional view of an optical pickup head according to a first embodiment of this invention.
Figure 4:
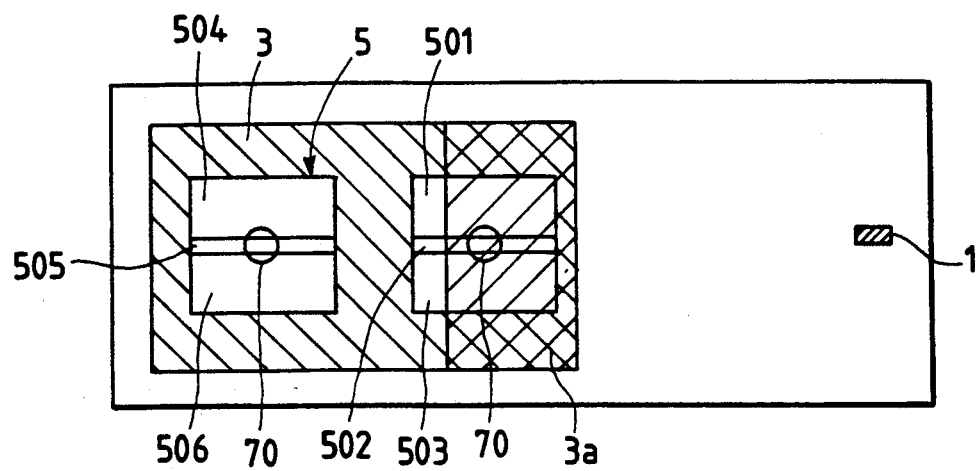
FIG. 4 is a view of the hybrid device in the optical pickup head of FIG. 3.

With reference to FIGS. 3 and 4, an optical pickup head includes a semiconductor laser light source 1 for emitting a coherent light beam 70 having a wavelength of, for example, 780 nm. A photodetector unit 5 includes a group of photodetectors 501, 502, and 503, and a group of photodetectors 504, 505, and 506. A prism 3 has a semitransparent surface 3a which obliquely opposes an output face of the laser light source 1. The laser light beam 70 emitted from the laser light source 1 is reflected by the semitransparent surface 3a of the prism 3. The laser light beam 70 reflected back from an optical recording medium 4 enters the prism 3 via its semitransparent surface 3a. The light source 1, the photodetector unit 5, and the prism 3 are housed in a package 2. The light source 1, the photodetector unit 5, the prism 3, and the package 2 compose a hybrid device mounted on a holding member (a holder) 23.

After the laser light beam 70 is reflected by the semitransparent surface 3a of the prism 3, it reaches a reflecting section (a reflector) 13 and is then successively reflected by the reflecting section 13 and another reflecting section (another reflector) 14 toward a condenser lens or an objective lens 8. The laser light beam 70 is incident to the lens 8, being focused by the lens 8 on the optical recording medium 4. The lens 8 is mounted on the holding member 23. The reflecting sections 13 and 14 are formed on a common support member (a common supporter) 15 fixed to the holding member 23. The formation of the reflecting sections 13 and 14 on the support member 15 is realized by a suitable known method such as aluminum vapor deposition or aluminum electric gilding.

Actuators 91 and 92 serve to move the holding member 23 and thus to move the lens 8 relative to the optical recording medium 4. Specifically, the actuator 91 functions to move the lens 8 along the optical axis of the lens 8 for focusing control. The actuator 92 functions to move the lens 8 in a direction perpendicular to the optical axis of the lens 8 for tracking control.

The laser light beam 70 emitted from the semiconductor laser (the laser light source) 1 is successively reflected by the semitransparent surface 3a of the prism 3 and the reflecting sections 13 and 14, being incident to the lens 8 and being focused by the lens 8 on the optical recording medium 4. The optical recording medium 4 includes a substrate or a base plate 20 coated with a protective film 21. The substrate 20 is formed with a pattern of a groove or pits which represents recorded information. The laser light beam 70 is reflected and diffracted back from the optical recording medium 4, returning to the lens 8 and passing through the lens 8. Then, the laser light beam 70 is guided to the semitransparent surface 3a of the prism 3 while being reflected by the reflecting sections 13 and 14. The laser light beam 70 enters the prism 3 via its semitransparent surface 3a and is then incident to the group of the photodetectors 501–503 within the photodetector unit 5. Approximately a half intensity of the laser light beam 70 is received by the photodetectors 501–503, and the remainder of the laser light beam 70 is reflected by the photodetectors 501–503. Then, the laser light beam 70 is reflected within the prism 3 toward the group of the photodetectors 504-506 of the photodetector unit 5 and is received by the photodetectors 504-506. The hybrid device is designed so that a focal point with respect to the laser light beam 70 will be present on the optical path between the group of the photodetectors 501-503 and the group of the photodetectors 504-506. The photodetectors 501-506 convert the received laser light beams 70 into corresponding electric signals. A radio-frequency information signal, a tracking error signal, and a focusing error signal are generated on the basis of the output signals from the photodetectors 501-506.

It is now assumed that an error occurs in the angle between the support member 15 and the holding member 23 during the assembly of the optical pickup head. Since both the reflecting sections 13 and 14 are formed on the common support member 15, the reflecting sections 13 and 14 have equal angular errors responsive to the error in the angle between the support member 15 and the holding member 23. The angular errors of the reflecting sections 13 and 14 cancel each other with respect to the directions of the travel of the laser light beam 70 inputted into and outputted from the combination of the reflecting sections 13 and 14. Specifically, the angular error of the reflecting section 13 causes an angular deviation of the path of the laser light beam 70 reflected by the reflecting section 13. The angular deviation of the path of the laser light beam 70 is cancelled when the laser light beam 70 is reflected by the reflecting section 14 which has the angular error equal to the angular error of the reflecting section 13. Thus, the path of the laser light beam 70 incident to the lens 8 can be aligned with the optical axis of the lens 8 independent of the error in the angle between the support member 15 and the holding member 23, and a certain error is allowed in the angle between the support member 15 and the holding member 23 during the assembly of the optical pickup head. This causes an increased efficiency of the production of the optical pickup head.

Figure 5:
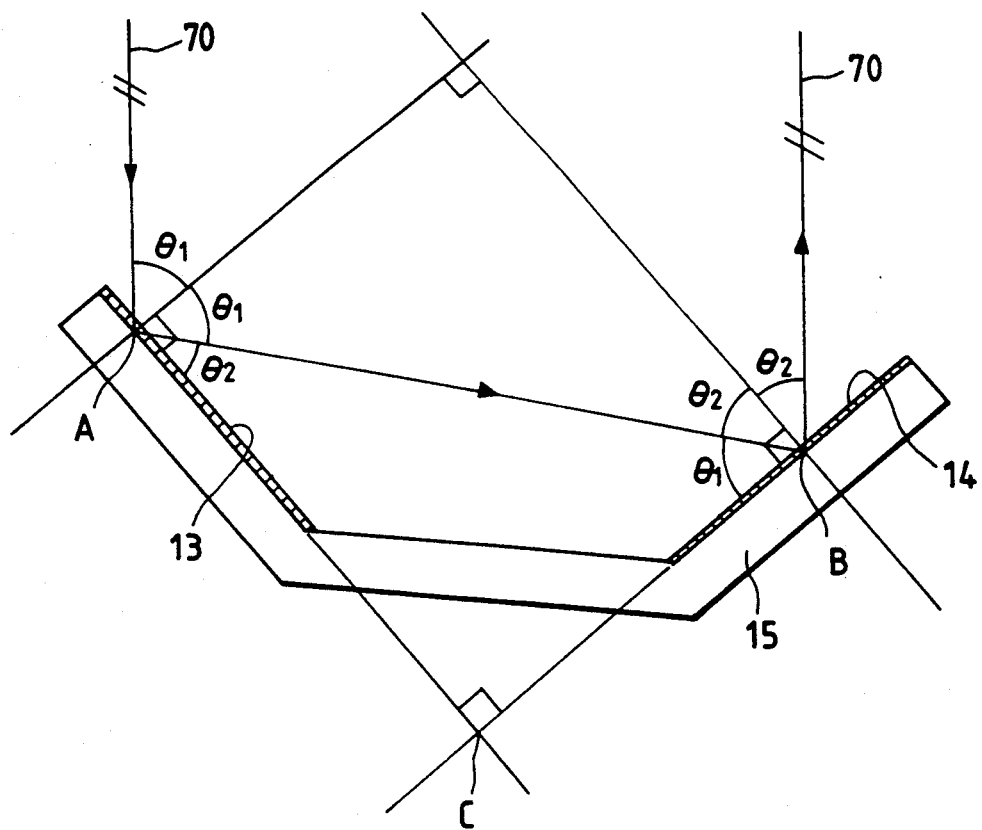
FIG. 5 is a sectional view of the reflecting sections and the support member in the optical pickup head of FIG. 3.

The reflecting sections 13 and 14 will be further described. As shown in FIG. 5, there is a right angle between the surfaces of the reflecting sections 13 and 14. It is now assumed that the laser light beam 70 is incident to a point A of the reflecting section 13 at an angle $\theta_1$. According to the reflection law, the angle of the reflection of the laser light beam 70 at the point A is equal to the angle $\theta_1$. The character $\theta_2$ is now introduced to represent the angle between the surface of the reflecting section 13 and the direction of the travel of the laser light beam 70 reflected by the reflecting section 13. The angles $\theta_1$ and $\theta_2$ have the relation as "$\theta_1 + \theta_2 = 90$ degrees". The character B is now introduced to represent a point of the reflecting section 14 which is exposed to the laser light beam 70 reflected by the point A of the reflecting section 13. Extended planes of the surfaces of the reflecting sections 13 and 14 intersect with each other at a point C. The angle between the surface of the reflecting section 14 and the direction of the travel of the laser light beam 70 incident to the point B of the reflecting section 14 is equal to the angle $\theta_1$ ($\theta_1 = 180$ degrees $- 90$ degrees $- \theta_2$) which agrees with the angle of the corner B of the right-angled triangle ABC. Thus, the incident angle of the laser light beam 70 applied to the reflecting section 14 is equal to the angle $\theta_2$ ($\theta_2 = 90$ degrees $- \theta_1$), and the reflection angle of the laser light beam 70 reflected by the reflecting section 14 is also equal to the angle $\theta_2$. The laser light beam 70 is subjected by the reflecting sections 13 and 14 to angular changes "$\theta_1 + \theta_1$" and "$\theta_2 + \theta_2$" in the direction of the travel respectively. Thus, the laser light beam 70 receives a resultant angular change "$2(\theta_1 + \theta_2)$" by the combination of the reflecting sections 13 and 14. The resultant angular change of the laser light beam 70 corresponds to an angle of 180 degrees since the sum of the angles $\theta_1$ and $\theta_2$ equals 90 degrees. The 180-degree angular change of the laser light beam 70 is independent of the angle $\theta_1$ at which the laser light beam 70 is incident to the reflecting section 13, and the direction of the travel of the laser light beam 70 incident to the reflecting section 13 and the direction of the travel of the laser light beam 70 reflected by the reflecting section 14 are kept parallel but opposite to each other.

Figure 6:
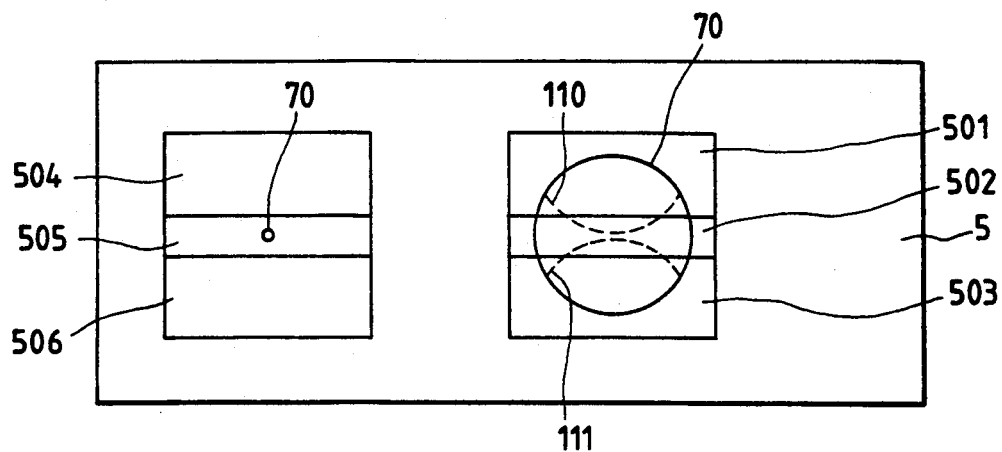
FIGS. 6-8 are views of the photodetector unit in the optical pickup head of FIG. 3.
Figure 7:
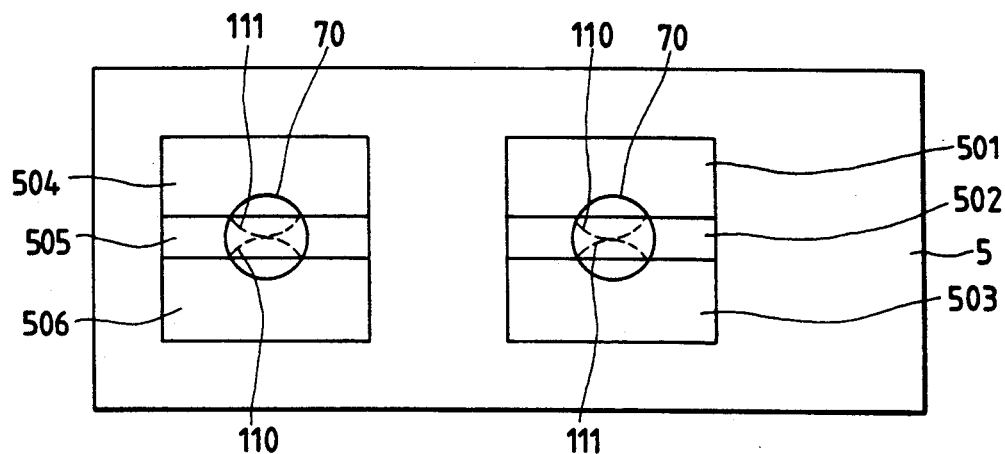
Figure 8:
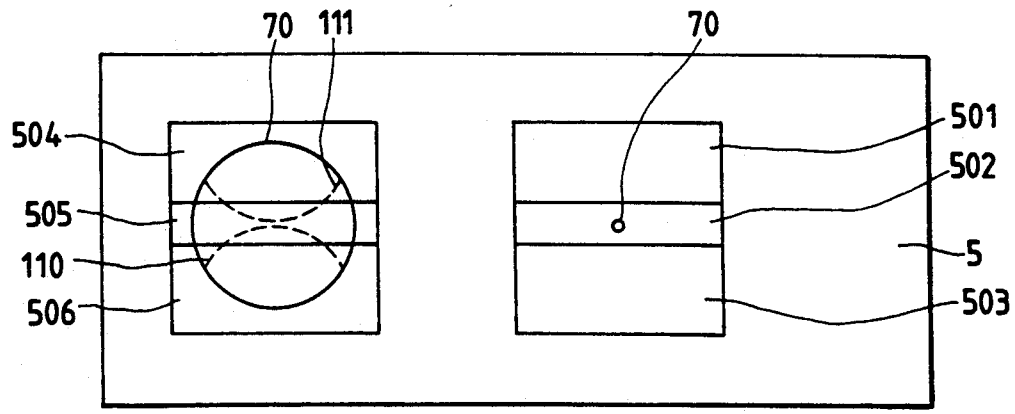

FIGS. 6, 7, and 8 show the relation between the laser light beam 70 and the photodectors 501-506 in the photodetector unit 5 under different conditions of the focusing of the laser light beam 70 on the optical recording medium 4. When the laser light beam 70 is accurately focused on the recording medium 4 (see FIG. 3), the group of the photodetectors 501-503 and the group of the photodectors 504-506 are illuminated by equal intermediate-size circles of the laser light beam 70 as shown in FIG. 7. When the laser light beam 70 is defocused in a first direction, the group of the photodectors 501-503 and the group of the photodetectors 504-506 are illuminated by large and small circles of the laser light beam 70 respectively as shown in FIG. 6. When the laser light beam 70 is defocused in a second direction, the group of the photodetectors 501-503 and the group of the photodetectors 504-506 are illuminated by small and large circles of the laser light beam 70 respectively as shown in FIG. 8.

The focusing error signal is generated on the basis of the difference between the output signals from the photodetectors 502 and 505 according to a well-known spot size detection technique. The focusing error signal may be generated on the basis of the difference between the sum of the output signals from the photodectors 502, 504, and 506 and the sum of the output signals from the photodetectors 501, 503, and 505. The focusing error signal is subjected to various signal processings such as amplification, phase compensation, and band limiting. The focusing control actuator 91 (see FIG. 3) is controlled in response to the focusing error signal by a control circuit (not shown) so that the laser light beam 70 can remain accurately focused on the optical recording medium 4.

The tracking error signal is generated on the basis of the difference between the output signals from the photodetectors 501 and 503 or the difference between the output signals from the photodetectors 504 and 506, provided that the longitudinal direction of the photodetectors 501-506 extends parallel to the images of a track or a pit sequence on the optical recording medium 4 which are represented by far field patterns 110 and 111 within the circles of the laser light beam 70 on the photodetectors 501-506. The tracking error signal is subjected to various signal processings such as amplification, phase compensation, and band limiting. The tracking control actuator 92 (see FIG. 3) is controlled in response to the tracking error signal by a control circuit (not shown) so that the laser light beam 70 can remain at a predetermined correct position relative to the track or the pit sequence on the optical recording medium 4.

The radio-frequency information signal is generated on the basis of the sum of the output signals from the photodetectors 501-506. The radio-frequency information signal is processed by a signal processing circuit (not shown) so that the recorded information can be extracted from the radio-frequency information signal.

DESCRIPTION OF THE SECOND PREFERRED EMBODIMENT

Figure 9:
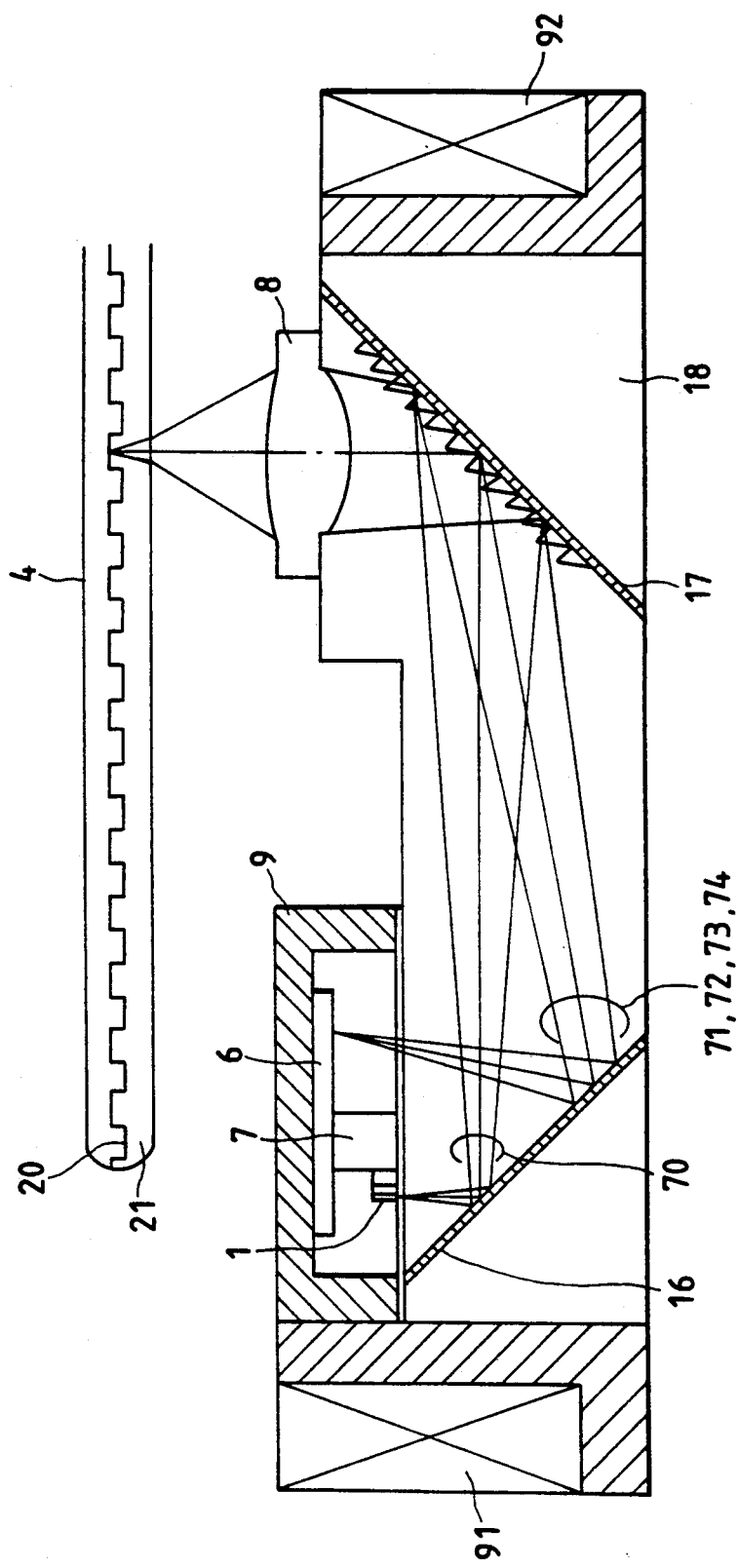
FIG. 9 is a sectional view of an optical pickup head according to a second embodiment of this invention.
Figure 10:
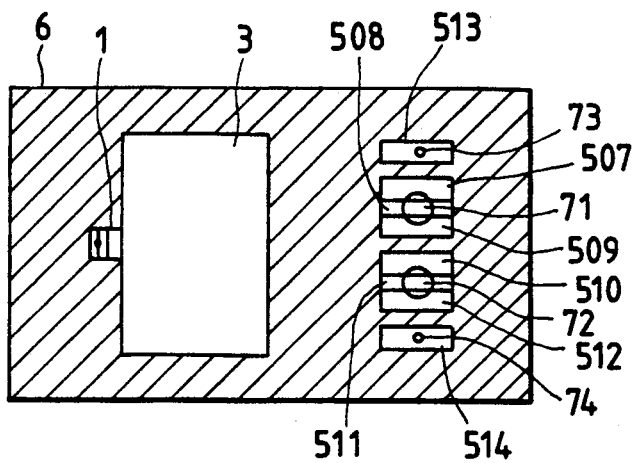
FIG. 10 is a view of the hybrid device in the optical pickup head of FIG. 9.

With reference to FIGS. 9 and 10, an optical pickup head includes a semiconductor laser (a laser light source) 1 for emitting a coherent light beam 70 having a wavelength of, for example, 780 nm. A photodetector unit 6 includes a group of photodetectors 507, 508, and 509, a group of photodetectors 510, 511, and 512, and separate photodetectors 513 and 514. The semiconductor laser (light source) 1 and the photodetector unit 6 are housed in a package 9. The semiconductor laser 1, the photodetector unit 6, and the package 9 compose a hybrid device mounted on a holding member 18. The semiconductor laser (the light source) 1 and the photodetector unit 6 are mounted on the surface of a block 7 which enables heat to escape from the semiconductor laser 1.

The laser light beam emitted from the light source (the semiconductor laser) 1 is successively reflected by reflecting sections 16 and 17, being incident to a lens 8 and being focused by the lens 8 on an optical recording medium 4. The reflecting section 17 is compose of a blazed reflection holographic optical element, and a 0-order diffraction light beam generated by the reflecting section 17 is focused on the optical recording medium 4. The lens 8 is mounted on the holding member 23. The reflecting sections 16 and 17 are formed on a common support member composed of the holding member 18.

Actuators 91 and 92 serve to move the holding member 18 and thus to move the lens 8 relative to the optical recording medium 4. Specifically, the actuator 91 functions to move the lens 8 along the optical axis of the lens 8 for focusing control. The actuator 92 functions to move the lens 8 in a direction perpendicular to the optical axis of the lens 8 for tracking control.

As described previously, the laser light beam 70 emitted from the laser light source (the semiconductor laser) 1 is successively reflected by the reflecting sections 16 and 17, being incident to the lens 8 and being focused by the lens 8 on the optical recording medium 4. Specifically, the 0-order diffraction light beam generated by the reflecting section 17 is focused on the optical recording medium 4. The optical recording medium 4 includes a substrate or a base plate 20 coated with a protective film 21. The substrate 20 is formed with a pattern of a groove or pits which represents recorded information. The laser light beam 70 is reflected and diffracted back from the optical recording medium 4, returning to the lens 8 and passing through the lens 8. Then, the laser light beam 70 is incident to the reflecting section 17. The incident laser light beam 70 is converted and separated by the diffracting effect of the reflecting section 17 into diffraction light beams 71, 72, 73, and 74. The diffraction light beams 71 and 72 are used for generating a focusing error signal. The diffraction light beams 73 and 74 are used for generating a tracking error signal. The diffraction light beams 71-74 are incident to the reflecting section 16, being reflected by the reflecting section 16 toward the photodetector unit 6 and being incident to the photodetector unit 6. The diffraction light beam 71 is received by the group of the photodetectors 507-509. The diffraction light beam 72 is received by the group of the photodetectors 510-512. The diffraction light beam 73 is received by the photodetector 513. The diffraction light beam 74 is received by the photodetector 514. The photodetectors 507-514 convert the received laser light beams 71-74 into corresponding electric signals. A radio-frequency information signal, a tracking error signal, and a focusing error signal are generated on the basis of the output signals from the photodetectors 507-514.

Since the reflecting sections 16 and 17 are formed on the common support member 18, a certain error is allowed in the angle and the position of the support member 18 during the assembly of the optical pickup head as in the embodiment of FIGS. 3-8. Thus, an increased efficiency of the production of the optical pickup head can be obtained.

Figure 11:
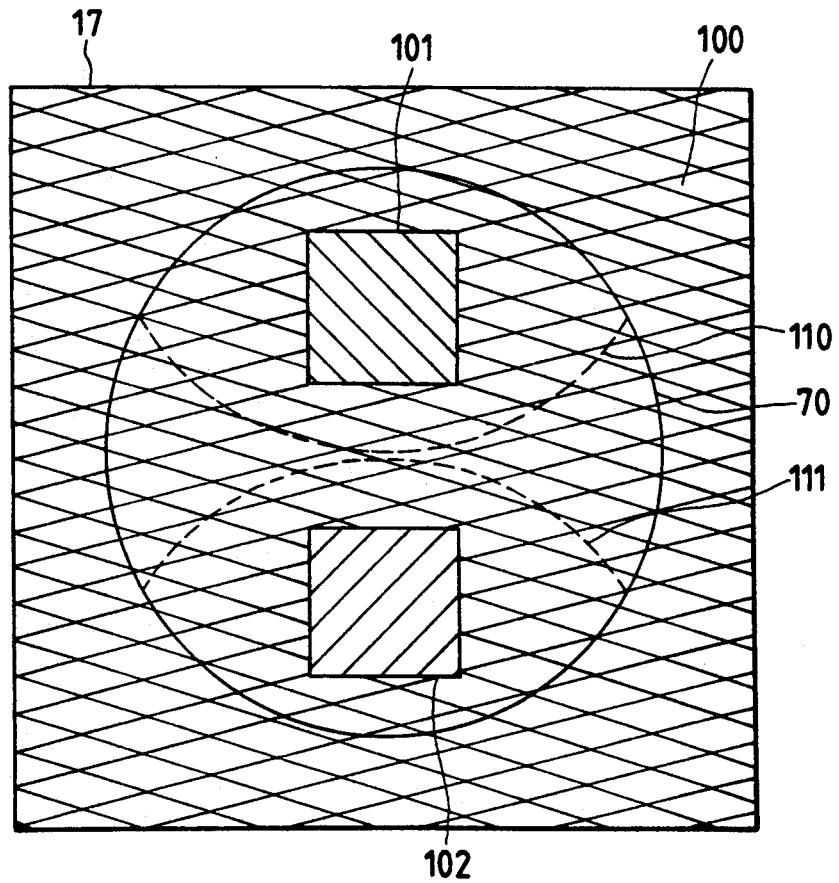
FIG. 11 is a plan view of the holographic optical element in the optical pickup head of FIG. 9.

FIG. 11 shows a pattern formed on the holographic optical element 17. The holographic optical element 17 has divided hologram regions 100, 101, and 102. The region 100 is formed with an inclined lattice pattern, being capable of generating two diffraction light beams of different wave surfaces and different focal points. The region 100 functions to generate the diffraction light beams 71 and 72 for the focusing error signal. The regions 101 and 102 are formed with patterns of parallel lines oblique to the lines of the region 100, serving to generate the diffraction light beams 73 and 74 for the tracking error signal respectively. When far field patterns 110 and 111 of the light beam 70 reflected and diffracted by the optical recording medium 4 are applied to good places in the holographic optical element 17 as shown in FIG. 11, a reliable tracking error signal can be obtained.

Figure 12:
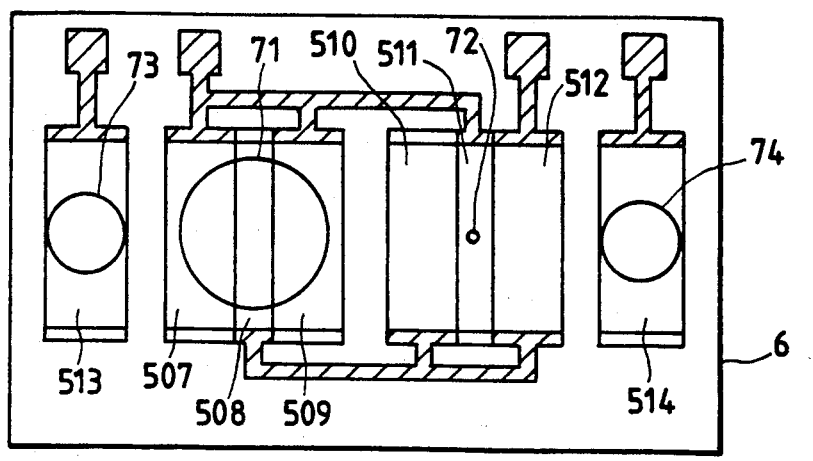
FIGS. 12-14 are views of the photodetector unit in the optical pickup head of FIG. 9.
Figure 13:
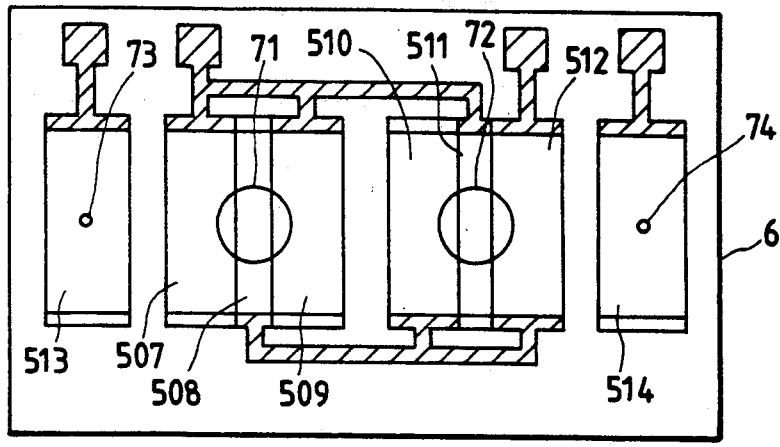
Figure 14:
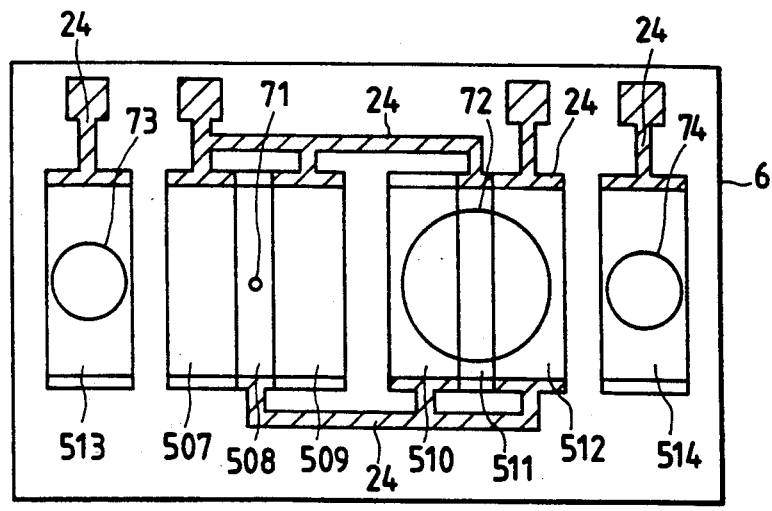

FIGS. 12, 13, and 14 show the relation between the diffraction light beams 71-74 and the photodetectors 507-514 in the photodetector unit 6 under different conditions of the focusing of the laser light beam 70 on the optical recording medium 4. When the laser light beam 70 is accurately focused on the recording medium 4 (see FIG. 9), the group of the photodetectors 507-509, the group of the photodetectors 510-512, the separate photodetector 513, and the separate photodetector 514 are exposed to an intermediate-size circle of the diffraction light beam 71, an intermediate-size circle of the diffraction light beam 72, a small circle of the diffraction light beam 73, and a small circle of the diffraction light beam 74 respectively as shown in FIG. 13. When the laser light beam 70 is defocused in a first direction, the group of the photodetectors 507-509, the group of the photodetectors 510-512, the separate photodetector 513, and the separate photodetector 514 are exposed to a large circle of the diffraction light beam 71, a small circle of the diffraction light beam 72, an intermediate-size circle of the diffraction light beam 73, and an intermediate-size circle of the diffraction light beam 74 respectively as shown in FIG. 12. When the laser light beam 70 is defocused in a second direction, the group of the photodetectors 507-509, the group of the photodetectors 510-512, the separate photodetector 513, and the separate photodetector 514 are exposed to a small circle of the diffraction light beam 71, a large circle of the diffraction light beam 72, an intermediate-size circle of the diffraction light beam 73, and an intermediate-size circle of the diffraction light beam 74 respectively as shown in FIG. 14.

The focusing error signal is generated on the basis of the difference between the output signals from the photodetectors 508 and 511. The focusing error signal may be generated on the basis of the difference between the sum of the output signals from the photodetectors 508, 510, and 512 and the sum of the output signals from the photodetectors 507, 509, and 511. The focusing error signal is subjected to various signal processings such as amplification, phase compensation, and band limiting. The focusing control actuator 91 (see FIG. 9) is controlled in response to the focusing error signal by a control circuit (not shown) so that the laser light beam 70 can remain accurately focused on the optical recording medium 4.

The tracking error signal is generated on the basis of the difference between the output signals from the photodetectors 513 and 514. The tracking error signal is subjected to various signal processings such as amplification, phase compensation, and band limiting. The tracking control actuator 92 (see FIG. 9) is controlled in response to the tracking error signal by a control circuit (not shown) so that the laser light beam 70 can remain at a predetermined correct position relative to a track or a pit sequence on the optical recording medium 4.

The radio-frequency information signal is generated on the basis of the sum of the output signals from the photodetectors 507-514. The radio-frequency information signal is processed by a signal processing circuit (not shown) so that the recorded information can be extracted from the radio-frequency information signal.

DESCRIPTION OF THE THIRD PREFERRED EMBODIMENT

A third embodiment of this invention is similar to the embodiment of FIGS. 9-14 except that the reflection holographic optical element 17 (see FIG. 9) is replaced by a simple reflector (a mirror) and that a transmission holographic optical element is disposed in the optical path between the hybrid device and the recording medium 4.

DESCRIPTION OF THE FOURTH PREFERRED EMBODIMENT

Figure 15:
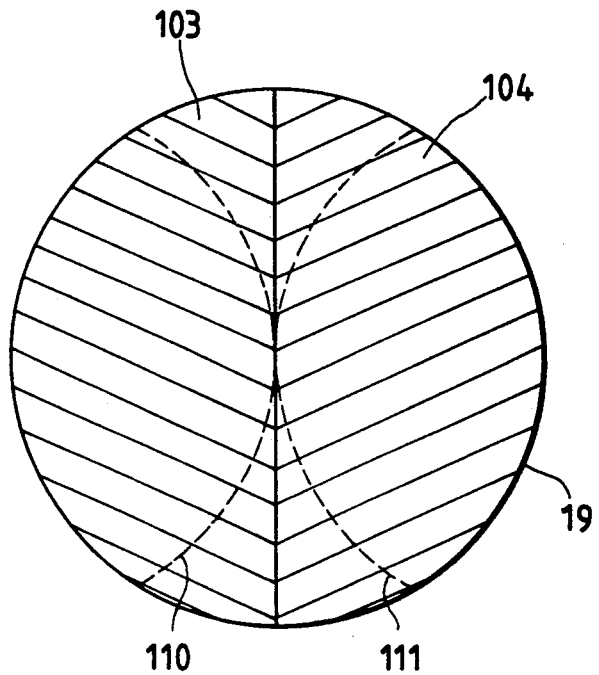
FIG. 15 is a plan view of a holographic optical element in an optical pickup head according to a fourth embodiment of this invention.
Figure 16:
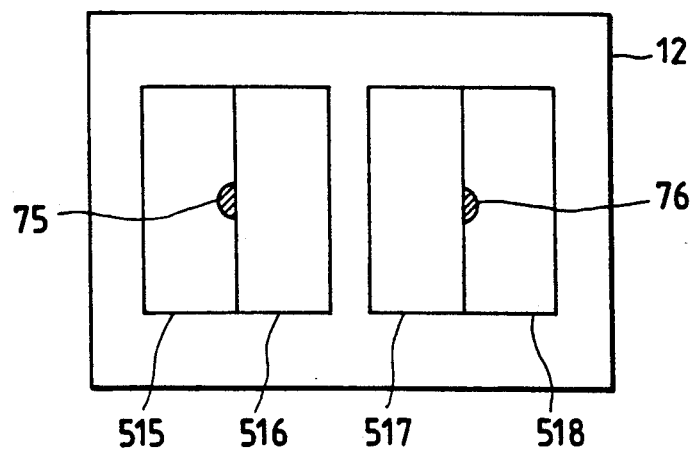
FIG. 16 is a view of a photodetector unit in the optical pickup head according to the fourth embodiment of this invention.

FIGS. 15 and 16 show portions of a fourth embodiment of this invention which is similar to the embodiment of FIGS. 9-14 except for design changes indicated hereinafter.

The holographic optical element 17 (see FIG. 9) is replaced by a holographic optical element 19. As shown in FIG. 15, the holographic optical element 19 has divided hologram regions 103 and 104. The region 103 is formed with a pattern of parallel lines curved slightly with a curvature which depends on the design of the optical pickup head. The region 104 is formed with a pattern of parallel lines oblique to the lines of the region 103. The regions 103 and 104 are capable of generating diffraction light beams having different wave surfaces respectively. The pattern on the holographic optical element 19 is designed so that first-order diffraction light beams 75 and 76 will be focused on a photodetector unit (described later).

The photodetector unit 6 (see FIG. 9) is replaced by a photodetector unit 12. As shown in FIG. 12, the photodetector unit 12 has a group of photodetectors 515 and 516, and a group of photodetectors 517 and 518. The group of the photodetectors 515 and 516, and the group of the photodetectors 517 and 518 are exposed to the diffraction light beams 75 and 76 generated from the regions 103 and 104 of the holographic optical element 19 respectively.

The photodetectors 515-518 convert the received diffraction light beams into corresponding electric signals. A radio-frequency information signal, a tracking error signal, and a focusing error signal are generated on the basis of the output signals from the photodetectors 515-518. When far field patterns 110 and 111 of a light beam 70 reflected and diffracted by an optical recording medium 4 are applied to good places in the holographic optical element 19 as shown in FIG. 15, a reliable tracking error signal and a reliable focusing error signal can be obtained according to a well-known double knife edge method. Specifically, the focusing error signal is generated on the basis of the difference between the sum of the output signals from the photodetectors 515 and 518 and the sum of the output signals from the photodetectors 516 and 517. The tracking error signal is generated on the basis of the difference between the sum of the output signals from the photodetectors 515 and 516 and the sum of the output signals from the photodetectors 517 and 518. The radio-frequency information signal is generated on the basis of the sum of the output signals from the photodetectors 515-518.

What is claimed is:

1. An optical pickup head operating on an optical recording medium, comprising:
   a light source emitting a light beam;
   a reflecting section reflecting the light beam emitted from the light source and changing a direction of travel of the light beam emitted from the light source into a first predetermined optical path;
   a holographic optical element receiving the light beam from the reflecting section via the first predetermined optical path, diffracting the light beam which has been reflected by the reflecting section, and generating a forward diffraction light beam from the light beam which has been reflected by the reflecting section;
   means for focusing the forward diffraction light beam generated by the holographic optical element on the optical recording medium, wherein the forward diffraction light beam is reflected and diffracted by the optical recording medium so that a return light beam is generated by the optical recording medium from the forward diffraction light beam;
   the holographic optical element receiving the return light beam from the optical recording medium, diffracting the return light beam, generating a backward diffraction light beam from the return light beam, and directing the backward diffraction light beam in a second predetermined optical path which differs in position from the first predetermined optical path;
   the reflecting section receiving the backward diffraction light beam from the holographic optical element via the second predetermined optical path, reflecting the backward diffraction light beam, and changing a direction of travel of the backward diffraction light beam; and
   means for detecting the backward diffraction light beam which has been reflected by the reflecting section.

2. The optical pickup head of claim 1, further comprising a common support member on which both the reflecting section and the holographic optical element are directly formed.

* * * * *